United States Patent
Wu et al.

(10) Patent No.: US 6,216,103 B1
(45) Date of Patent: Apr. 10, 2001

(54) METHOD FOR IMPLEMENTING A SPEECH RECOGNITION SYSTEM TO DETERMINE SPEECH ENDPOINTS DURING CONDITIONS WITH BACKGROUND NOISE

(75) Inventors: Duanpei Wu, Sunnyvale; Miyuki Tanaka, Campbell; Ruxin Chen, San Jose; Lex Olorenshaw, Madera, all of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 08/957,875

(22) Filed: Oct. 20, 1997

(51) Int. Cl.$^7$ .................................................. G01L 3/00
(52) U.S. Cl. ............................................................ 704/253
(58) Field of Search ................................... 704/233, 253, 704/231

(56) References Cited

U.S. PATENT DOCUMENTS

| Re. 32,172 | * | 6/1986 | Johnston et al. | 704/248 |
| 4,696,041 | * | 9/1987 | Sakata | 704/248 |
| 4,821,325 | * | 4/1989 | Martin et al. | 704/248 |
| 5,305,422 | * | 4/1994 | Junqua | 704/248 |

OTHER PUBLICATIONS

Parsons. Voice and Speech Processing. McGraw–Hill, Inc. New York. pp. 295–297., 1987.*

Deller et al. Discrete Time Processing of Speech Signals. Macmillan Publishing Company. new York. pp. 224–251., 1993.*

Rabiner et al. Fundamentals of Speech Recognition. Prentice Hall. New Jersey. pp. 143–149., 1993.*

Rangoussi et al. On the Use of Higher Order Statistics for Robust Endpoint Detection of Speech. IEEE Signal Processing Workshop on Higher Order Statistics. pp. 56–60, 1993.*

Jean–Claude Junqua, Brain Mak, and Ben Reaves; A Robust Algorithm For Word Boundary Dectection In The Presence Of Noise; IEEE Transactions On Speech And Audio Processing, vol.2, No. 3 , Jul. 1994; pp. 406–412.

Brian Mak, Jean–Claude Junqua, and Ben Reaves; A Robust Speech/Non–Speech Detection Algorithm Using Time And Frequency–Based Features; IEEE 1992; pp. I–269–I–272.

* cited by examiner

Primary Examiner—Emanuel Todd Voeltz
Assistant Examiner—M. David Sofocleous
(74) Attorney, Agent, or Firm—Gregory J. Koerner; Simon & Koerner LLP

(57) ABSTRACT

A method for implementing a speech recognition system for use during conditions with background noise includes the steps of calculating, in real-time, sequential short-term delta energy parameters for speech energy from a spoken utterance, determining threshold values in the speech energy, and identifying a beginning point and an ending point for the spoken utterance based on the relationship between the threshold values and the short-term delta energy parameters.

47 Claims, 13 Drawing Sheets

METHOD FOR IMPLEMENTING A SPEECH RECOGNITION SYSTEM TO DETERMINE SPEECH ENDPOINTS DURING CONDITIONS WITH BACKGROUND NOISE

BACKGROUND OF THE INVENTION

1. Field of the Invention

This invention relates generally to electronic speech recognition systems and relates more particularly to a method for implementing a speech recognition system for use during conditions with background noise.

2. Description of the Background Art

Implementing an effective and efficient method for system users to interface with electronic devices is a significant consideration of system designers and manufacturers. Human speech recognition is one promising technique that allows a system user to effectively communicate with selected electronic devices, such as digital computer systems. Speech typically consists of one or more spoken utterances which each may include a single word or a series of closely-spaced words forming a phrase or a sentence. In practice, speech recognition systems typically determine the endpoints (the beginning and ending points) of a spoken utterance to accurately identify the specific sound data intended for analysis. Conditions with significant ambient background-noise levels present additional difficulties when implementing a speech recognition system. Examples of such conditions may include speech recognition in automobiles or in certain manufacturing facilities. In such user applications, in order to accurately analyze a particular utterance, a speech recognition system may be required to selectively differentiate between a spoken utterance and the ambient background noise.

Referring now to FIG. 1, a diagram of speech energy 110 from an exemplary spoken utterance is shown. In FIG. 1, speech energy 110 is shown with time values displayed on the horizontal axis and with speech energy values displayed on the vertical axis. Speech energy 110 is shown as a data sample which begins at time 116 and which ends at time 118. Furthermore, the particular spoken utterance represented in FIG. 1 includes a beginning point $t_s$ which is shown at time 112 and also includes an ending point $t_e$ which is shown at time 114.

In many speech detection systems, the system user must identify a spoken utterance by manually indicating the beginning and ending points with a user input device, such as a push button or a momentary switch. This "push-to-talk" system presents serious disadvantages in applications where the system user is otherwise occupied, such as while operating an automobile in congested traffic conditions. A system that automatically identifies the beginning and ending points of a spoken utterance thus provides a more effective and efficient method of implementing speech recognition in many user applications.

Some speech-recognition systems determine the beginning and ending points of a spoken utterance by using non-real time analysis techniques. For example, a speech-recognition system may first capture all the speech energy 110 corresponding to a particular utterance starting at time 116 and ending at time 118. Then, the non-real time system may subsequently process the captured speech energy 110 to determine beginning point $t_s$ at time 112 and ending point $t_e$ at time 114. The non-real time system thus delays the calculation of the beginning and ending points until the entire utterance is captured and processed. In contrast, a system which continually recalculates and updates beginning and ending points in real-time as speech energy 110 is being acquired may provide a more responsive and flexible method for implementing a speech recognition system.

Speech recognition systems use many different speech parameters, including amplitude, short-term auto-correlation coefficients, zero-crossing rates, linear prediction error and harmonic analysis. In spite of attempts to select speech parameters that effectively and accurately allow the detection of human speech, robust speech detection under conditions of significant background noise remains a challenging problem. A system that selects and utilizes effective speech parameters to perform robust speech detection in conditions with background noise may thus provide a more useful and powerful method of speech recognition. Therefore, for all the foregoing reasons, an improved method is needed for implementing a speech recognition system for use during conditions with background noise.

SUMMARY OF THE INVENTION

In accordance with the present invention, a method is disclosed for implementing a speech recognition system for use during conditions with background noise. The invention includes a feature extractor within the speech recognition system that receives digital speech data corresponding to a spoken utterance. Within the feature extractor, a filter bank receives the speech data and responsively generates channel energy which is provided to an endpoint detector. The channel energy from the filter bank in the feature extractor is also provided to a feature vector calculator which generates feature vectors that are then provided to a recognizer.

In accordance with the present invention, the endpoint detector analyzes the channel energy received from the feature extractor and responsively determines endpoints (beginning and ending points) for the particular spoken utterance represented by the channel energy. In practice the endpoint detector performs the fundamental steps of first detecting a reliable island in the speech energy from the spoken utterance, and then refining the boundaries (beginning and ending points) of the spoken utterance. The present invention repeatedly recalculates short-term delta energy parameters (DTF parameters) and threshold values in real time, as speech energy is processed by the endpoint detector. In the preferred embodiment, the starting point of the reliable island ($t_{sr}$) is detected when the current DTF(i) parameter is first greater than a threshold $T_{sr}$ for at least five frames. In the preferred embodiment, the stopping point of the reliable island ($t_{er}$) is detected when the current DTF(i) value is less than a threshold $T_{er}$ for at least 60 frames (600 milliseconds) or less than a threshold $T_e$ for at least 40 frames (400 milliseconds).

After the starting point $t_{sr}$ of the reliable island is detected, a backward-searching (or refinement) procedure is used to find the beginning point $t_s$ of the spoken utterance. In the preferred embodiment, the searching range for this refinement procedure is limited to thirty five frames (350 milliseconds) from the starting point $t_{sr}$ of the reliable island. The beginning point $t_s$ of the utterance is preferably found when the current DTF(i) parameter is less than a beginning threshold $T_s$ for at least seven frames. Similarly, the ending point $t_e$ of the spoken utterance may preferably be found when the current DTF(i) parameter is less than an ending threshold $T_e$ for a predetermined number of frames.

The endpoint detector provides the identified endpoints (beginning and ending points of the spoken utterance) to the recognizer and may also, under certain error conditions, provide a restart signal to the recognizer. The recognizer responsively utilizes the feature vectors and the endpoints to perform a speech recognition procedure and advantageously generate a speech recognition result, in accordance with the present invention. The present invention thus efficiently and effectively implements a speech recognition system for use during conditions with background noise.

DETAILED DESCRIPTION OF THE PREFERRED EMBODIMENT

The present invention relates to an improvement in speech recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shows but is to be accorded the widest scope consistent with the principles and features described herein.

The present invention includes a method for implementing a speech recognition system for use during conditions with background noise, including the steps of calculating, in real-time, sequential short-term delta energy parameters for speech energy from a spoken utterance event, determining threshold values in the speech energy, and then identifying a beginning point and an ending point for the spoken utterance based on the relationship between the threshold values and the short-term delta energy parameters.

Figure 1:
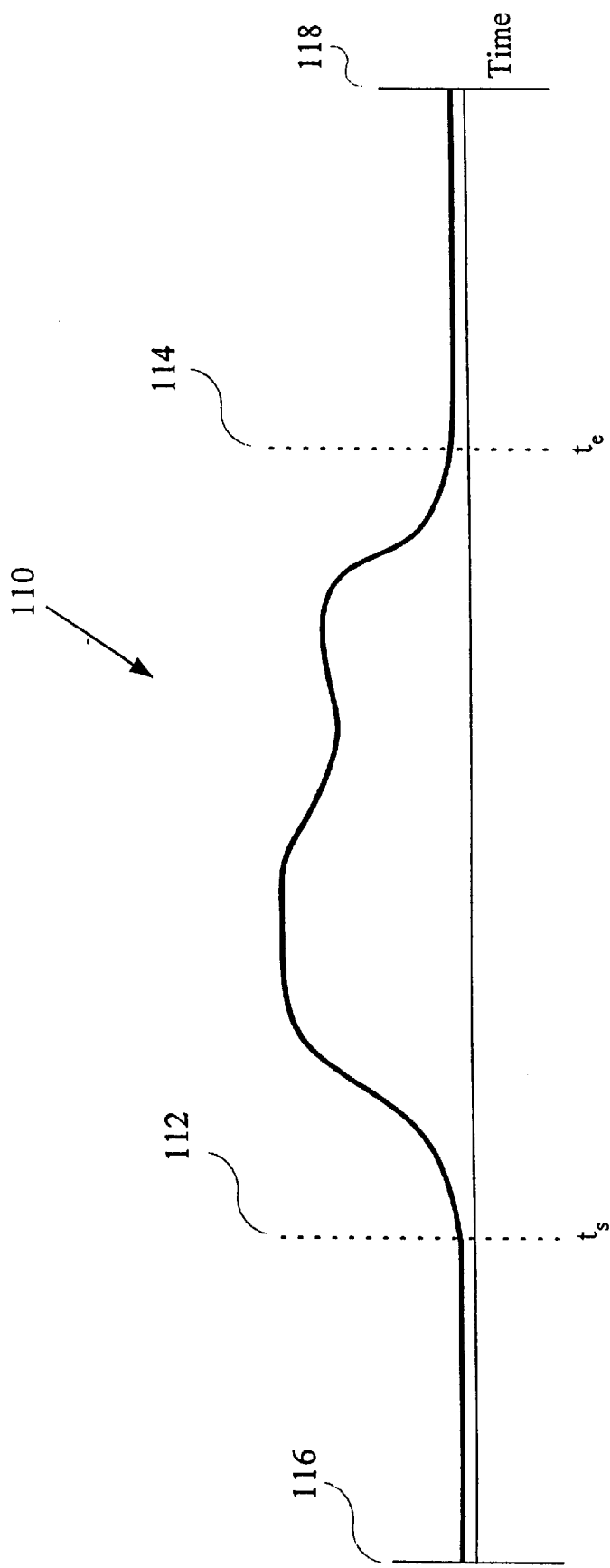
FIG. 1 is a diagram of speech energy from an exemplary spoken utterance.
Figure 2:
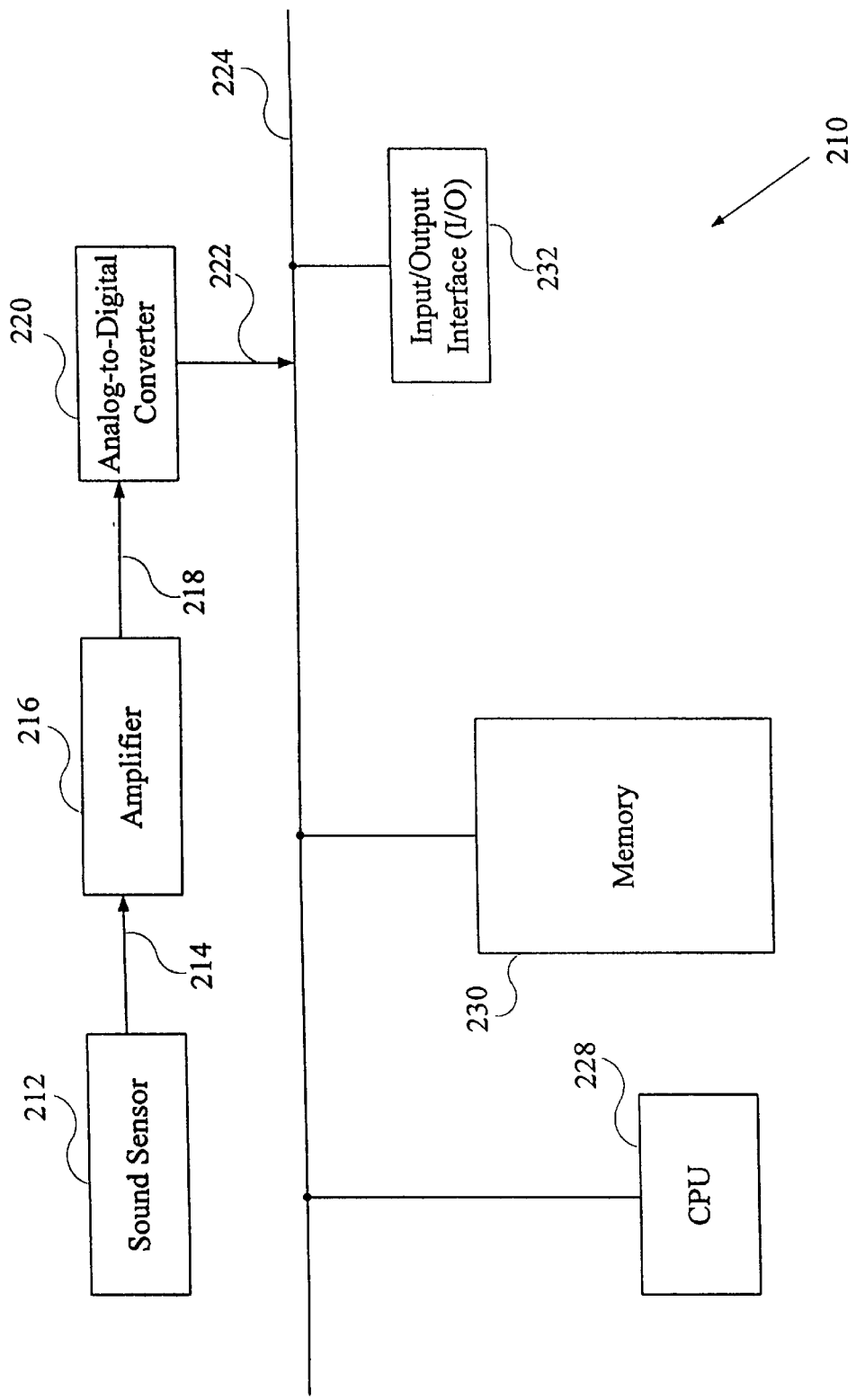
FIG. 2 is a block diagram of one embodiment for a computer system, in accordance with the present invention.

Referring now to FIG. 2, a block diagram of one embodiment for a computer system 210 is shown, in accordance with the present invention.

The FIG. 2 embodiment includes a sound sensor 212, an amplifier 216, an analog-to-digital converter 220, a central processing unit (CPU) 228, a memory 230 and an input/output device 232.

In operation, sound sensor 212 detects ambient sound energy and converts the detected sound energy into an analog speech signal which is provided to amplifier 216 via line 214. Amplifier 216 amplifies the received analog speech signal and provides an amplified analog speech signal to analog-to-digital converter 220 via line 218. Analog-to-digital converter 220 then converts the amplified analog speech signal into corresponding digital speech data and provides the digital speech data via line 222 to system bus 224.

CPU 228 may then access the digital speech data on system bus 224 and responsively analyze and process the digital speech data to perform speech recognition according to software instructions contained in memory 230. The operation of CPU 228 and the software instructions in memory 230 are further discussed below in conjunction with FIGS. 3–12. After the speech data is processed, CPU 228 may then advantageously provide the results of the speech recognition analysis to other devices (not shown) via input/output interface 232.

Figure 3:
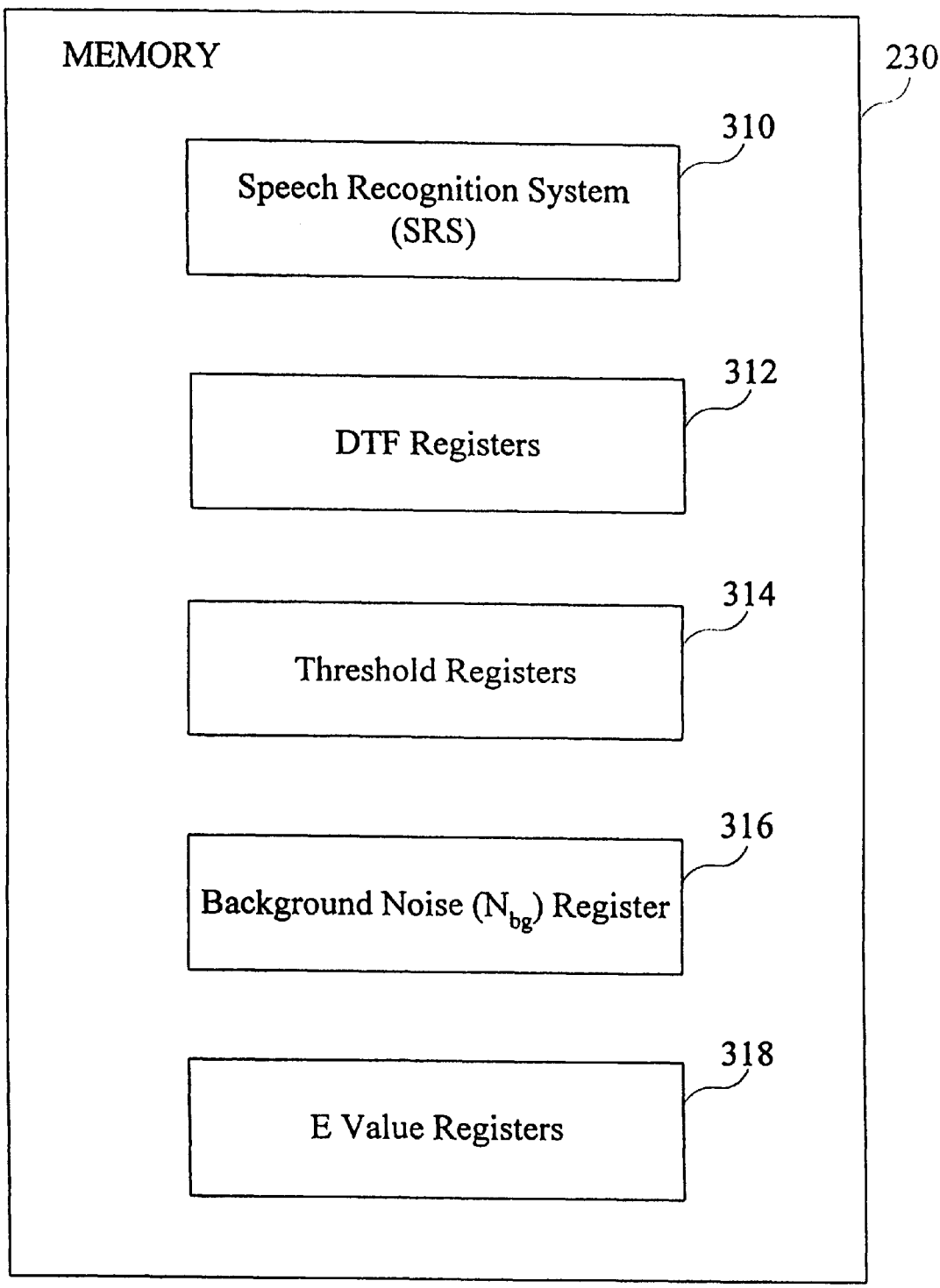
FIG. 3 is a block diagram of one embodiment for the memory of FIG. 2, in accordance with the present invention.

Referring now to FIG. 3, a block diagram of one embodiment for memory 230 of FIG. 2 is shown. Memory 230 may alternatively comprise various storage-device configurations, including Random-Access Memory (RAM) and non-volatile storage devices such as floppy-disks or hard disk-drives. In the FIG. 3 embodiment, memory 230 includes a speech recognition system (SRS) 310, dynamic time-frequency parameter (DTF) registers 312, threshold registers 314, background noise ($N_{bg}$ register 316 and E value registers 318.

In the preferred embodiment, speech recognition system 310 includes a series of software modules which are executed by CPU 228 to detect and analyze speech data, and which are further described below in conjunction with FIG. 4. In alternate embodiments, speech recognition system 310 may readily be implemented using various other software and/or hardware configurations. DTF registers 312, threshold registers 314, background noise register 316 and E value registers 318 contain respective variable values which are calculated and utilized by speech recognition system 310 to determine the beginning and ending points of a spoken utterance according to the present invention. The contents of DTF registers 312 are further described below in conjunction with FIGS. 6–7. The contents of background noise register 316 is further described below in conjunction with FIG. 8. The contents of threshold registers 314 and E value registers 318 are further described below in conjunction with FIG. 9(b).

Figure 4:
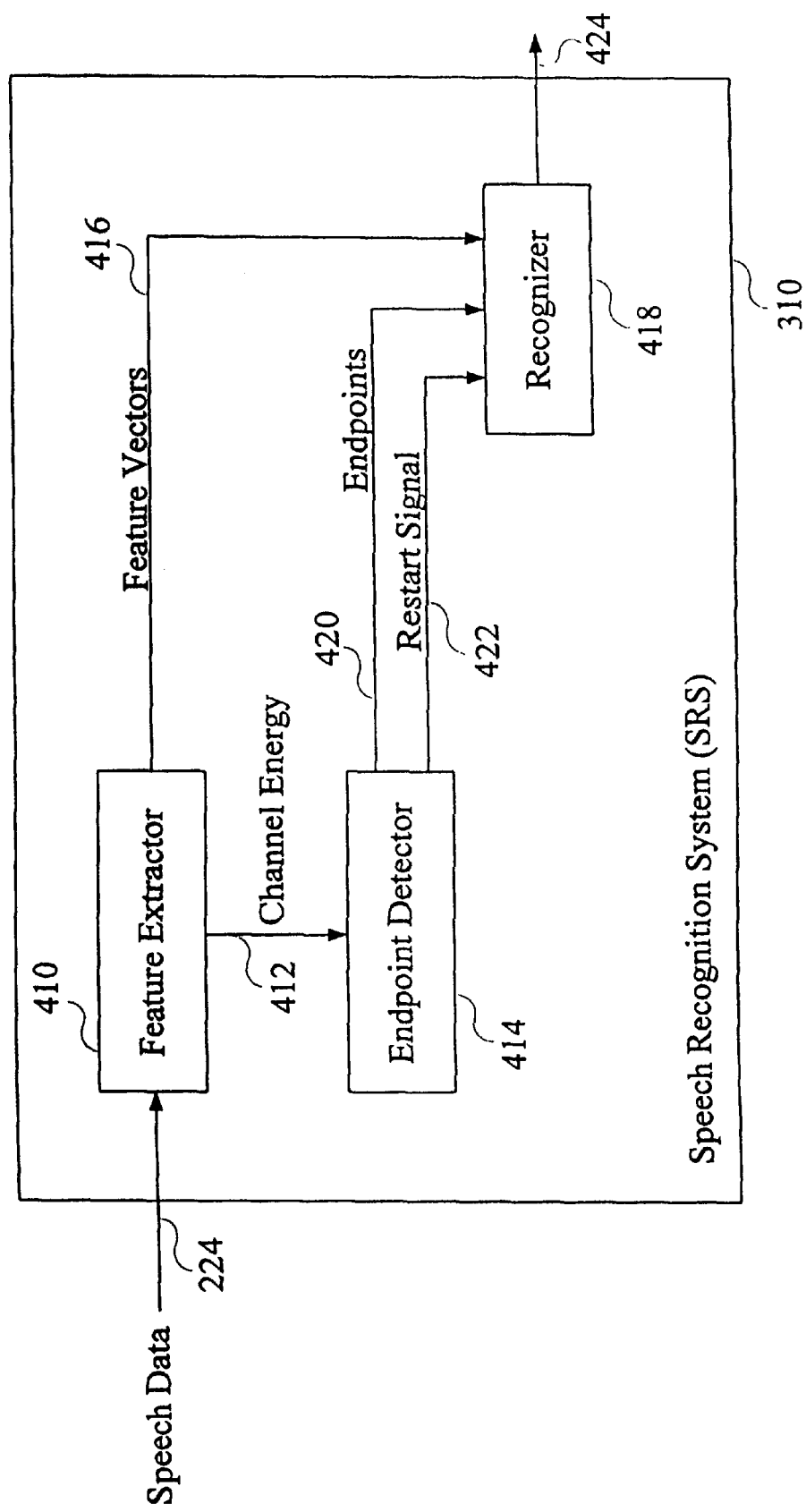
FIG. 4 is a block diagram of the preferred embodiment for the speech recognition system of FIG. 3.

Referring now to FIG. 4, a block diagram of the preferred embodiment for the FIG. 3 speech recognition system 310 is shown. In the FIG. 3 embodiment, speech recognition system 310 includes a feature extractor 410, an endpoint detector 414 and a recognizer 418.

In operation, analog-to-digital converter 220 (FIG. 2) provides digital speech data to feature extractor 410 within speech recognition system 310 via system bus 224. A high-pass filtering system in feature extractor 410 may therefore be used to emphasize high-frequency components of human speech, as well as to reduce low-frequency background noise levels.

Within feature extractor 410, a buffer memory temporarily stores the speech data before passing the speech data to a pre-emphasis module which preferably pre-emphasizes the speech data as defined by the following equation:

$$x1(n)=x(n)-0.97x(n-1)$$

where x(n) is the speech data signal and x1(n) is the pre-emphasized speech data signal.

A filter bank in feature extractor 410 then receives the pre-emphasized speech data and responsively generates channel energy which is provided to endpoint detector 414 via line 412. In the preferred embodiment, the filter bank in feature extractor 410 is a mel-frequency scaled filter bank which is further described below in conjunction with FIG. 6. The channel energy from the filter bank in feature extractor 410 is also provided to a feature vector calculator in feature extractor 410 to generate feature vectors which are then provided to recognizer 418 via line 416. In the preferred embodiment, the feature vector calculator is a mel-scaled frequency capture (mfcc) feature vector calculator.

In accordance with the present invention, endpoint detector 414 analyzes the channel energy received from feature extractor 410 and responsively determines endpoints (beginning and ending points) for the particular spoken utterance represented by the channel energy received on line 412. The preferred method for determining endpoints is further discussed below in conjunction with FIGS. 5–12.

Endpoint detector 414 then provides the calculated endpoints to recognizer 418 via line 420 and may also, under certain conditions, provide a restart signal to recognizer 418 via line 422. The generation and function of the restart signal on line 422 is further discussed below in conjunction with FIG. 10. Recognizer 418 receives feature vectors on line 416 and endpoints on line 420 and responsively performs a speech recognition procedure to advantageously generate a speech recognition result to CPU 228 via line 424.

Figure 5:
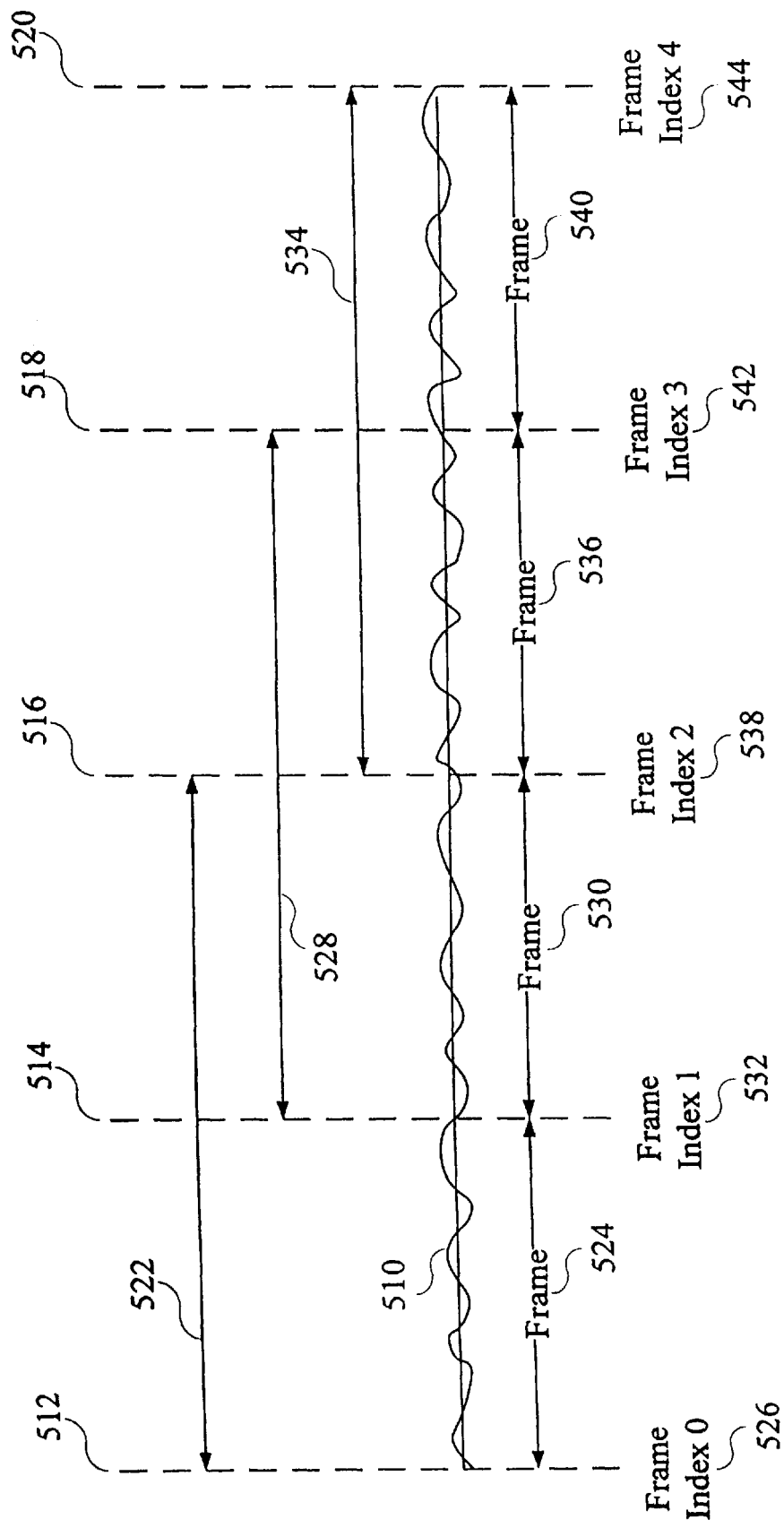
FIG. 5 is a timing diagram showing frames of speech energy, in accordance with the present invention.

Referring now to FIG. 5, a timing diagram showing frames of speech energy is shown, in accordance with the present invention. FIG. 5 includes speech energy 510 which extends from time 512 to time 520 and which is presented for purposes of illustration only. In the preferred embodiment, speech energy 510 may be divided into a series of overlapping windows which have durations of 20 milliseconds, and which begin at 10 millisecond intervals. For example, a first window 522 begins at time 512 and ends at time 516, a second window 528 begins at time 514 and ends at time 518, and a third window 534 begins at time 516 and ends at time 520.

In the preferred embodiment, the first half of each window forms a 10-millisecond frame. In FIG. 5, a first frame 524 begins at time 512 and ends at time 514, a second frame 530 begins at time 514 and ends at time 516, a third frame 536 begins at time 516 and ends at time 518, and a fourth frame 540 begins at time 518 and ends at time 520. In FIG. 5, only four frames 524, 530, 536 and 540 are shown for purposes of illustration. In practice, however, the present invention typically uses significantly greater numbers of consecutive frames depending upon the duration of speech energy 510. Speech energy 510 is thus sampled with a repeating series of contiguous 10-millisecond frames which occur at a constant frequency.

In the preferred embodiment, each frame is uniquely associated with a corresponding frame index. In FIG. 5, the first frame 524 is associated with frame index 0 (526) at time 512, the second frame 530 is associated with frame index 1 (532) at time 514, the third frame 536 is associated with frame index 2 (538) at time 516, and the fourth frame is associated with frame index 3 (542) at time 518. The relative location of a particular frame in speech energy 510 may thus be identified by reference to the corresponding frame index.

Figure 6:
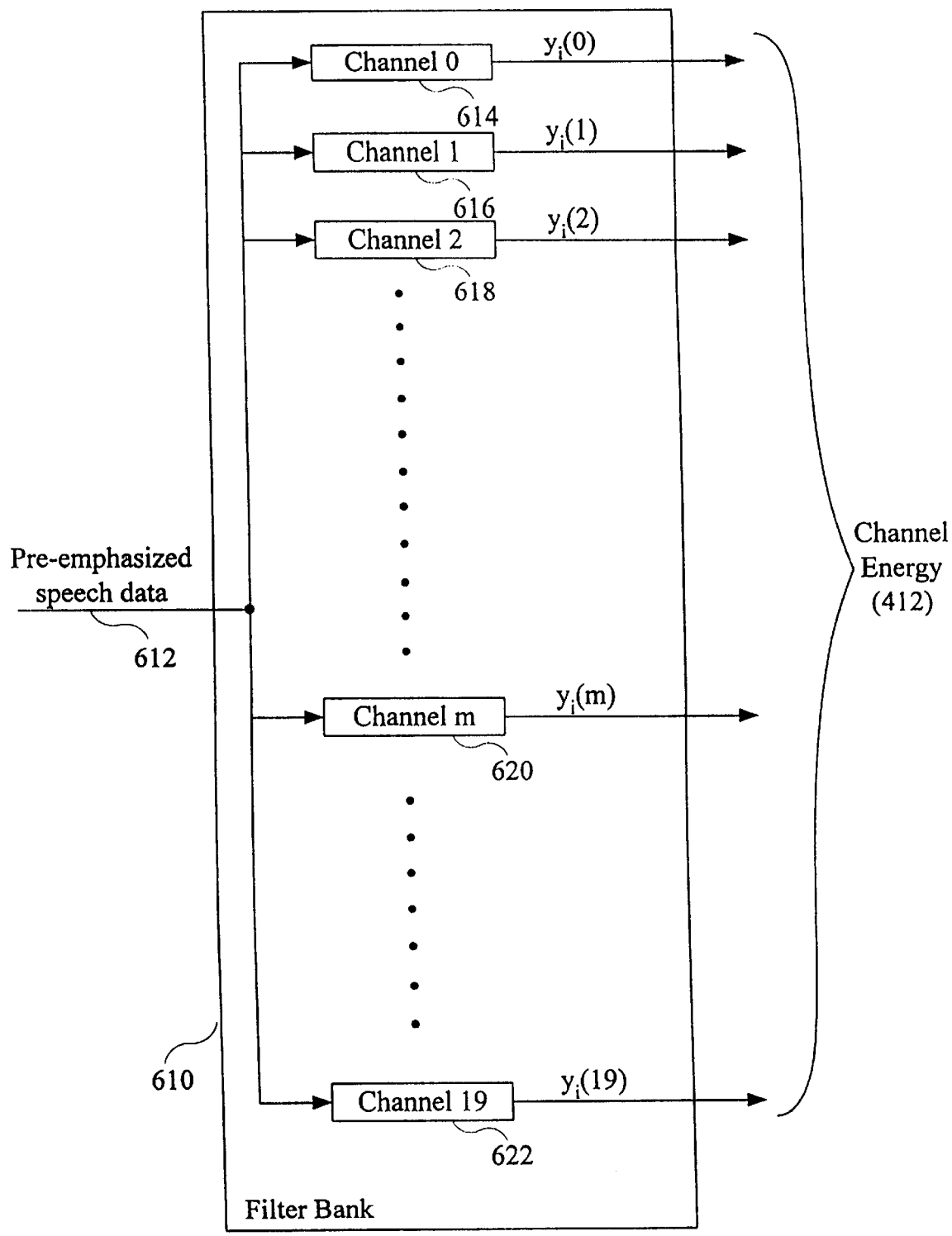
FIG. 6 is a schematic diagram of one embodiment for the filter bank of the FIG. 4 feature extractor.

Referring now to FIG. 6, a schematic diagram of one embodiment for filter bank 610 of feature extractor 410 (FIG. 4) is shown. In the preferred embodiment, filter bank 610 is a mel-frequency scaled filter bank with twenty channels (channel 0 (614) through channel 19 (622)). In alternate embodiments, various other implementations of filter bank 610 are equally possible.

In operation, filter bank 610 receives pre-emphasized speech data via line 612 and provides the speech data in parallel to channel 0 (614) through channel 19 (622). In response, channel 0 (614) through channel 19 (622) generate respective filter output energies $y_i(0)$ through $y_i(19)$ which collectively form the channel energy provided to endpoint detector via line 412 (FIG. 4).

The output energy of a selected channel m 620 of filter bank 610 may be represented by the variable $y_i(m)$ which is preferably calculated using the following equation:

$$y_i(m) = \sum_k (h_m(k) y_i'(k))^2, m = 0, \ldots, 19$$

where $y_i(m)$ is the output energy of the m-th channel 620 filter at frame index i, and $h_m(k)$ is the m-th channel 620 triangle filter designed based on the mel-frequency scale represented by the following equation:

$$Mel(f) = 2595 \log_{10}\left(1 + \frac{f}{700}\right)$$

where the range of the frequency band is from 200 Hertz to 5500 Hertz.

The variable $y_i'(k)$ above is preferably calculated using the following equation:

$$y_i'(k) = FFT_{512}(x_i(1) w_h(1))$$

where $x_i(1)$ is the i-th frame-index speech segment with window size L=20 milliseconds which is zero-padded to fit a Fast Fourier Transform (FFT) length of 512 points, and where $w_h(1)$ is a hanning window of speech data.

Filter bank 610 in feature extractor 410 thus processes the pre-emphasized speech data received on line 612 to generate and provide channel energy to endpoint detector 414 via line 412. Endpoint detector 414 may then advantageously detect the beginning and ending points of the spoken utterance represented by the received channel energy, in accordance with the present invention.

Figure 7:
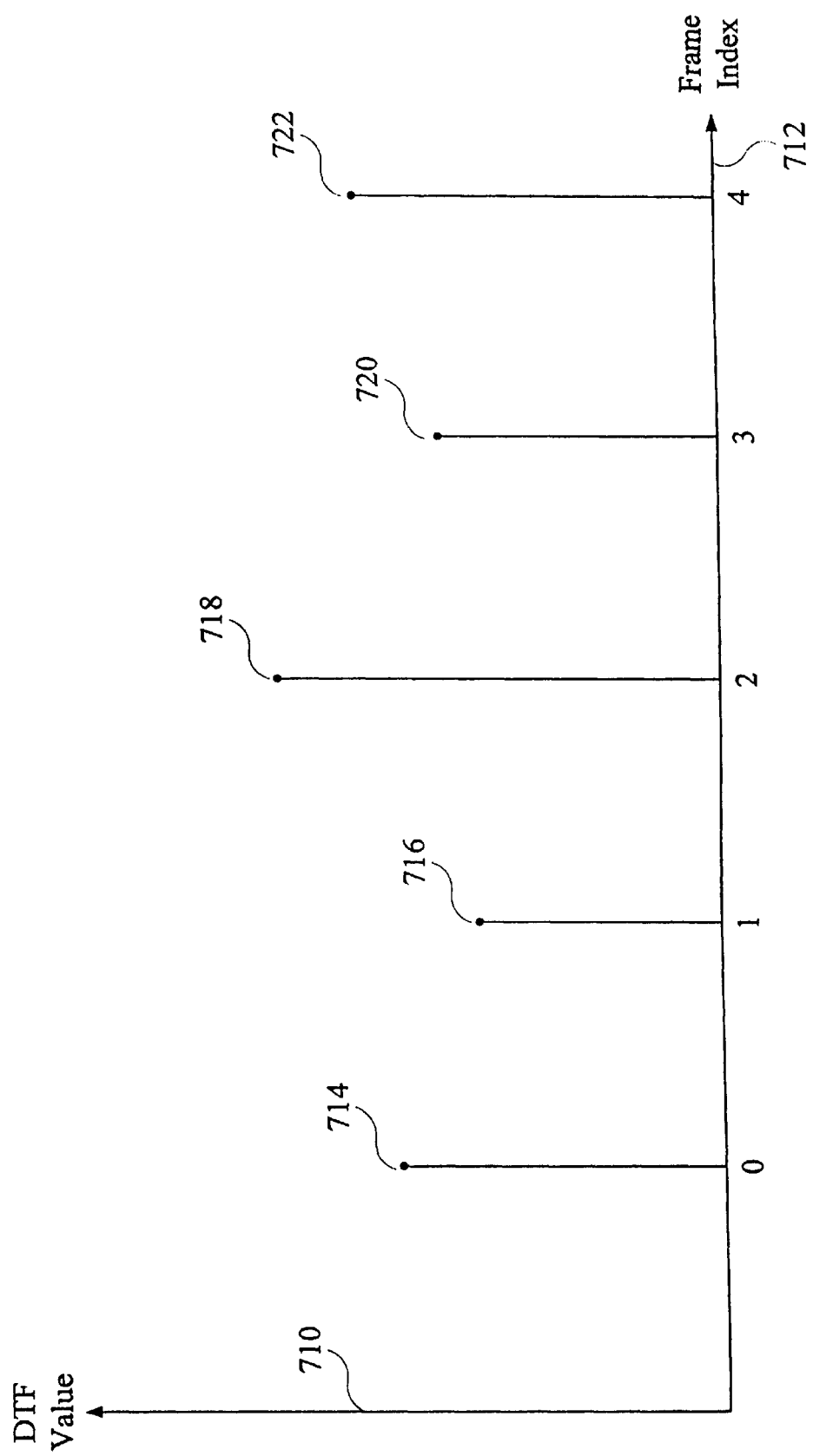
FIG. 7 is a graph of exemplary DTF values illustrating a five-point median filter, according to the present invention.

Referring now to FIG. 7, a graph of exemplary DTF values illustrating a five-point median filter is shown. In the preferred embodiment of the present invention, endpoint detector 414 uses delta short term energy (hereafter referred to as the dynamic time-frequency parameter (DTF)) to robustly detect the beginning and ending points of an utterance. The DTF parameters are preferably calculated using the following equation:

$$DTF'(i) = \sum_m \left| \sum_{l=1}^{2} l(y_{i+l}(m) - y_{i-l}(m)) \right| / 10$$

where $y_i(m)$ is the m-th channel 620 output energy of the mel-frequency spaced filter-bank 610 (FIG. 6) at frame index i, as discussed above in conjunction with FIG. 6. Channel m 620 may be selected from any one of the channels within filter bank 610. Further, in alternate embodiments, the present invention may readily calculate and utilize other types of energy parameters to effectively perform speech recognition techniques, in accordance with the present invention.

Endpoint detector 414 thus calculates, in real time, separate DTF parameters which each correspond with an associated frame of speech data received from feature extractor 410. The DTF parameters provide noise cancellation due to the subtraction operation of the foregoing DTF parameter calculation. Speech recognition system 310 therefore advantageously exhibits reduced sensitivity to many types of ambient background noise.

DTF'(i) is then smoothed by the 5-point median filter illustrated in FIG. 7 to obtain the preferred short-term delta energy parameter DTF(i). The FIG. 7 graph displays DTF values on vertical axis 710 and frame index values on horizontal axis 712. In practice, a current DTF parameter is generated by calculating the median value of the current DTF parameter in combination with the four immediately preceding DTF parameters. In the FIG. 7 example, the current DTF parameter is thus calculated by finding the median of values 714, 716, 718, 720 and 722. The preferred parameter DTF(i) may thus be expressed with the following equation:

$$DTF(i) = MedianFilter(\sqrt{DTF'(i)}).$$

Figure 8:
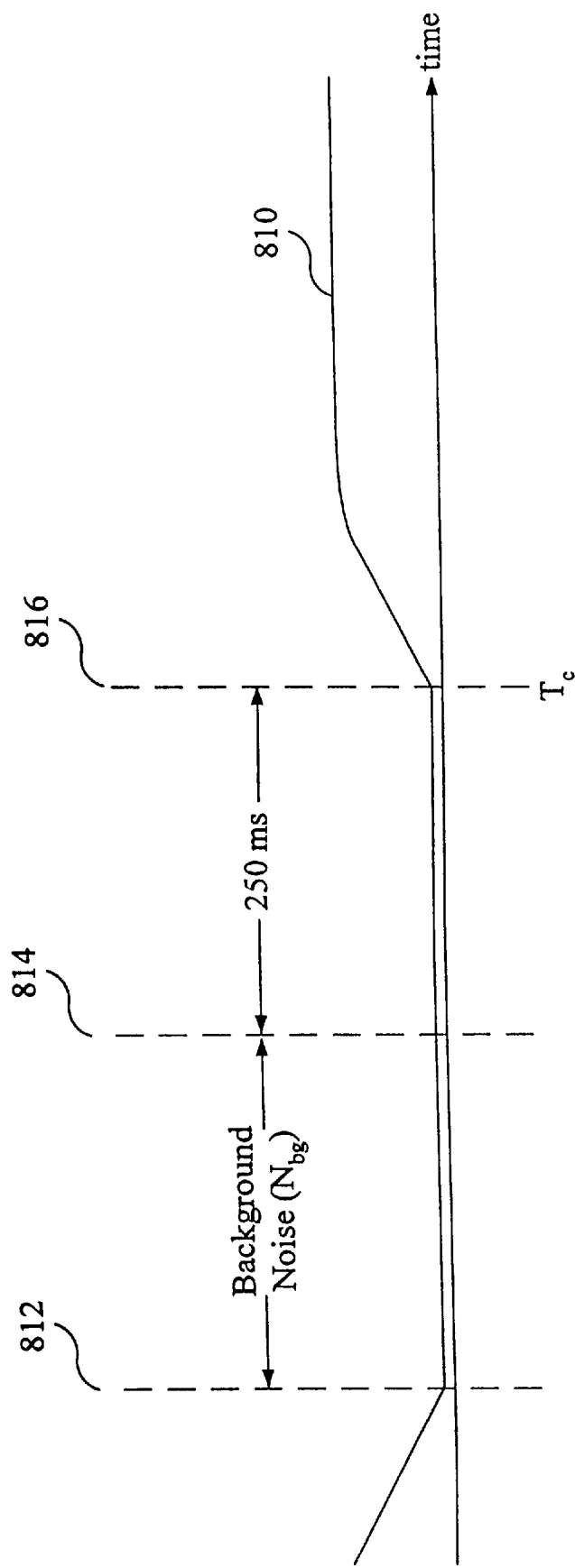
FIG. 8 is a diagram of speech energy illustrating the calculation of background noise ($N_{bg}$), according to the present invention.

Referring now to FIG. 8, a diagram of speech energy 810 illustrating the calculation of background noise ($N_{bg}$) is shown, according to the present invention. In the preferred embodiment, background noise ($N_{bg}$) is derived by calculating the DTF parameters for a segment of the speech energy 810 which satisfies two conditions. The first condition requires that endpoint detector 414 calculate $N_{bg}$ from a segment of speech energy 810 that is at least 250 milliseconds ahead of the beginning point of a reliable island in speech energy 810.

In the FIG. 8 example, the beginning point of a reliable island in speech energy 810 is shown as $T_c$ at time 816. Endpoint detector 414 thus preferably calculates $N_{bg}$ from time 812 to time 814, in order to maintain 250 milliseconds between the background noise segment ending at time 814 and the beginning point $t_c$ of the reliable island shown at time 816.

The second condition for calculating $N_{bg}$ requires that the normalized deviation (ND) for the background noise segment of speech energy 810 be less than a pre-determined constant value. In the preferred embodiment, the normalized deviation ND is defined by the following equation:

$$ND = \frac{\sqrt{\frac{1}{L}\sum_i (DTF(i) - \underline{DTF})^2}}{\underline{DTF}}$$

where $\underline{DTF}$ is the average of DTF(i) over the estimated background noise segment of speech energy 810 and L is the number of frames in the same background noise segment of speech energy 810.

Figure 9A:
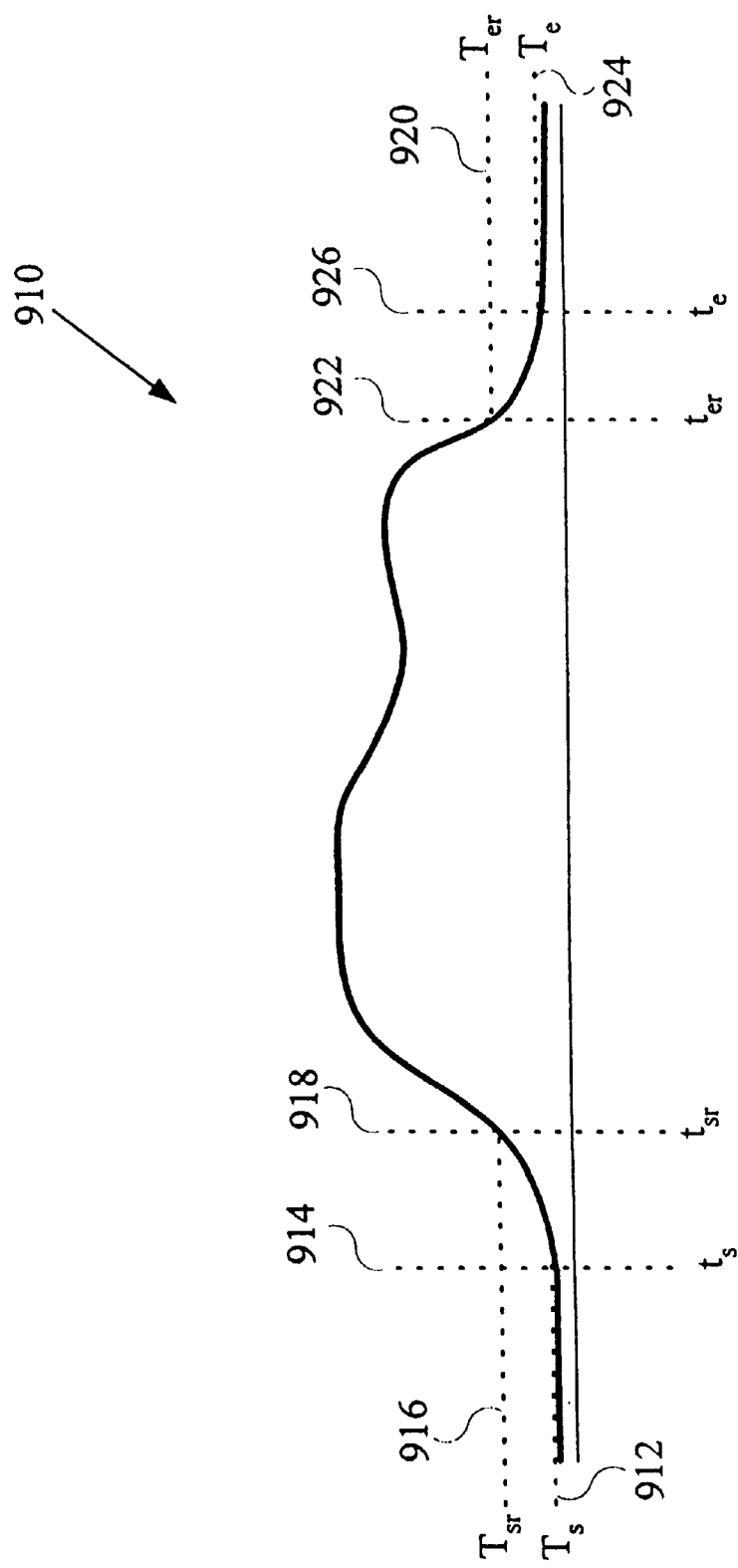
FIG. 9(a) is a diagram of exemplary speech energy, including a reliable island and thresholds, in accordance with the present invention.

Referring now to FIG. 9(a), a diagram of exemplary speech energy 910 is shown, including a reliable island and four thresholds, in accordance with the present invention. Speech energy 910 represents an exemplary spoken utterance which has a beginning point $t_s$ shown at time 914 and an ending point $t_e$ shown at time 926. In the preferred embodiment, threshold $T_s$ 912 is used to refine the beginning point $t_s$ of speech energy 910, and threshold $T_e$ 924 is used to refine the ending point of speech energy 910. The waveform of the FIG. 9(a) speech energy 910 is presented for purposes of illustration only and may alternatively comprise various other waveforms.

Speech energy 910 also includes a reliable island region which has a starting point $t_{sr}$ shown at time 918, and a stopping point $t_{er}$ shown at time 922. In the preferred embodiment, threshold $T_{sr}$ 916 is used to detect the starting point $t_{sr}$ of the reliable island in speech energy 910, and threshold $T_{er}$ 920 is used to detect the stopping point of the reliable island in speech energy 910. In operation, endpoint detector 414 repeatedly recalculates the foregoing thresholds ($T_s$ 912, $T_e$ 920, $T_{sr}$ 916, and $T_{er}$ 920) in real time to correctly locate the beginning point $t_s$ and the ending point $t_e$ of speech energy 910.

Figure 9B:
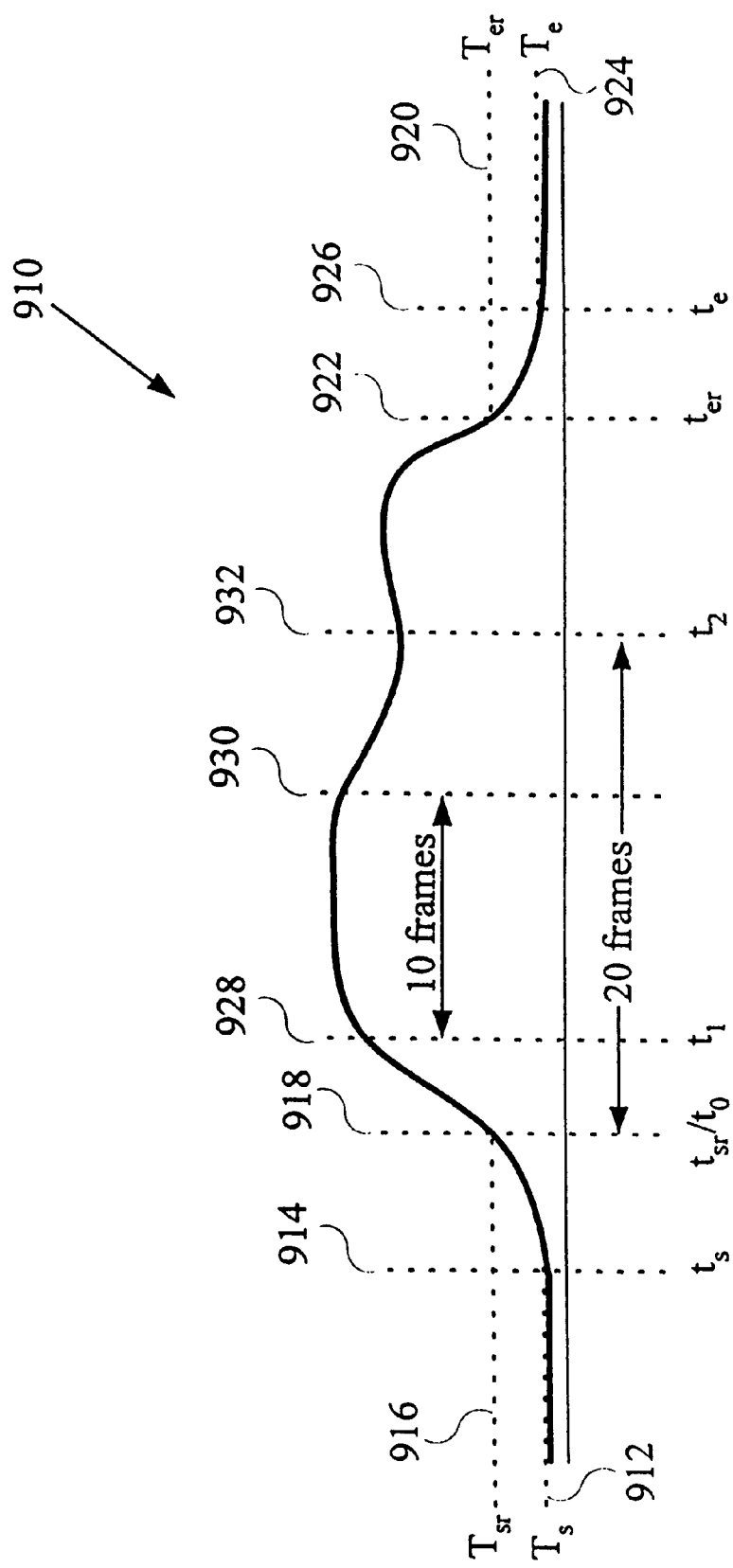
FIG. 9(b) is a diagram of exemplary speech energy illustrating the calculation of thresholds, in accordance with the present invention.

Referring now to FIG. 9(b), a diagram of exemplary speech energy 910 is shown, illustrating the calculation of threshold values, in accordance with the present invention. In the preferred embodiment, thresholds $T_s$ 912, $T_e$ 920, $T_{sr}$ 916, and $T_{er}$ 920 are adaptive to background noise $N_{bg}$) values and the signal-to-noise ratio (SNR). In the preferred embodiment, calculation of the SNR values require endpoint detector 414 to determine a series of E values ($E_{ls}$ and $E_{le}$) which represent maximum average speech energy at various points along speech energy 910.

For real-time implementation, only the local or current SNR value is available. The SNR value for a beginning point $SNR_{ls}$ is estimated after the beginning point $t_{sr}$ of a reliable island has been detected as shown at time 918. The beginning point $SNR_{ls}$ is preferably calculated using the following equation:

$$SNR_{ls} = \sqrt{(E_{ls} - N_{bg}^2)/N_{bg}^2}$$

where $E_{ls}$ is the average maximum energy calculated over 10-frame DTF parameters shown between time 928 and time 930 of FIG. 9(b). The 10-frame maximum average of $E_{ls}$ is searched for within the 20-frame window shown from time $t_0$ at time 918 and time $t_2$ at time 932. $E_{ls}$ is preferably defined by the following equation:

$$E_{ls} = \operatorname*{Max}_{tl}\left(\frac{1}{10}\sum_{i=tl}^{tl+9}(DTF(i))^2\right), t_1 = t_0, \ldots, t_2 - 9$$

where to is the start of the 20-frame window shown at time 918 and $t_2$ the end of the 20-frame window shown at time 932.

The SNR value for the ending point $SNR_{le}$ is estimated during the real-time process of searching for the ending point $t_{er}$ of a reliable island shown at time 922. The $SNR_{le}$ value may preferably be calculated and defined using the following equation:

$$SNR_{le} = \sqrt{(E_{le} - N_{bg}^2)/N_{bg}^2}$$

where $E_{le}$ is the current maximum average energy as endpoint detector 414 advances to process sequential frames of speech energy 910 in real-time. $E_{le}$ is derived in a similar manner as $E_{ls}$, and may preferably be defined using the following equation:

$$E_{le} = \operatorname*{Max}_{tl}\left(\frac{1}{10}\sum_{i=tl}^{tl+9}(DTF(i))^2\right), t_1 = t_0, \ldots, t_c - 9$$

where $t_c$ (the current frame index in speech energy 910) is the end of the moving 20-frame window and $t_0$ is the start of the same moving 20-frame window.

When endpoint detector 414 has calculated $SNR_{ls}$ and $SNR_{le}$, as described above, and background noise $N_{bg}$ has been determined, then thresholds $T_s$ 912 and $T_e$ 926 can be defined using the following equations:

$$T_s = N_{bg}\sqrt{(1+SNR_{ls}^{2/c_s})}$$

$$T_e = N_{bg}\sqrt{(1+SNR_{le}^{2/c_e})}$$

where $c_s$ is a constant for the beginning point determination, and $c_e$ is a constant for the ending point determination.

Thresholds $T_{sr}$ 916 and $T_{er}$ 920 can be determined using a methodology which is similar to that used to determine thresholds $T_s$ 912 and $T_e$ 926. In a real-time implementation, since $SNR_{ls}$ is not available to determine $T_{sr}$ 916, a SNR value is assumed. In the preferred embodiment, thresholds $T_{sr}$ 916 and $T_{er}$ 920 may be defined using the following equations:

$$T_{sr} = N_{bg}\sqrt{(1+SNR_{ls}^{2/c_{sr}})}$$

$$T_{er} = N_{bg}\sqrt{(1+SNR_{le}^{2/c_{er}})}$$

where $c_{sr}$ and $c_{er}$ are constants. For conditions of unstable noise, thresholds $T_{sr}$ 916 and $T_{er}$ 920 may be further refined according to the following equations:

$$T_{sr} = N_{bg}\sqrt{(1+SNR_{ls}^{2/c_{sr}})}(1+c_2 e^{-c_3 N_{bg}}) + c_1 V_{bg}$$

$$T_{er} = N_{bg}\sqrt{(1+SNR_{le}^{2/c_{er}})}(1+c_2 e^{-c_3 N_{bg}}) + c_1 V_{bg}$$

where $c_1$, $c_2$ and $c_3$ are constants, and $V_{bg}$ is the sample standard deviation of the background noise. Endpoint detector 414 repeatedly updates the foregoing SNR values and threshold values as the real-time processing of speech energy 910 progresses.

Figure 10:
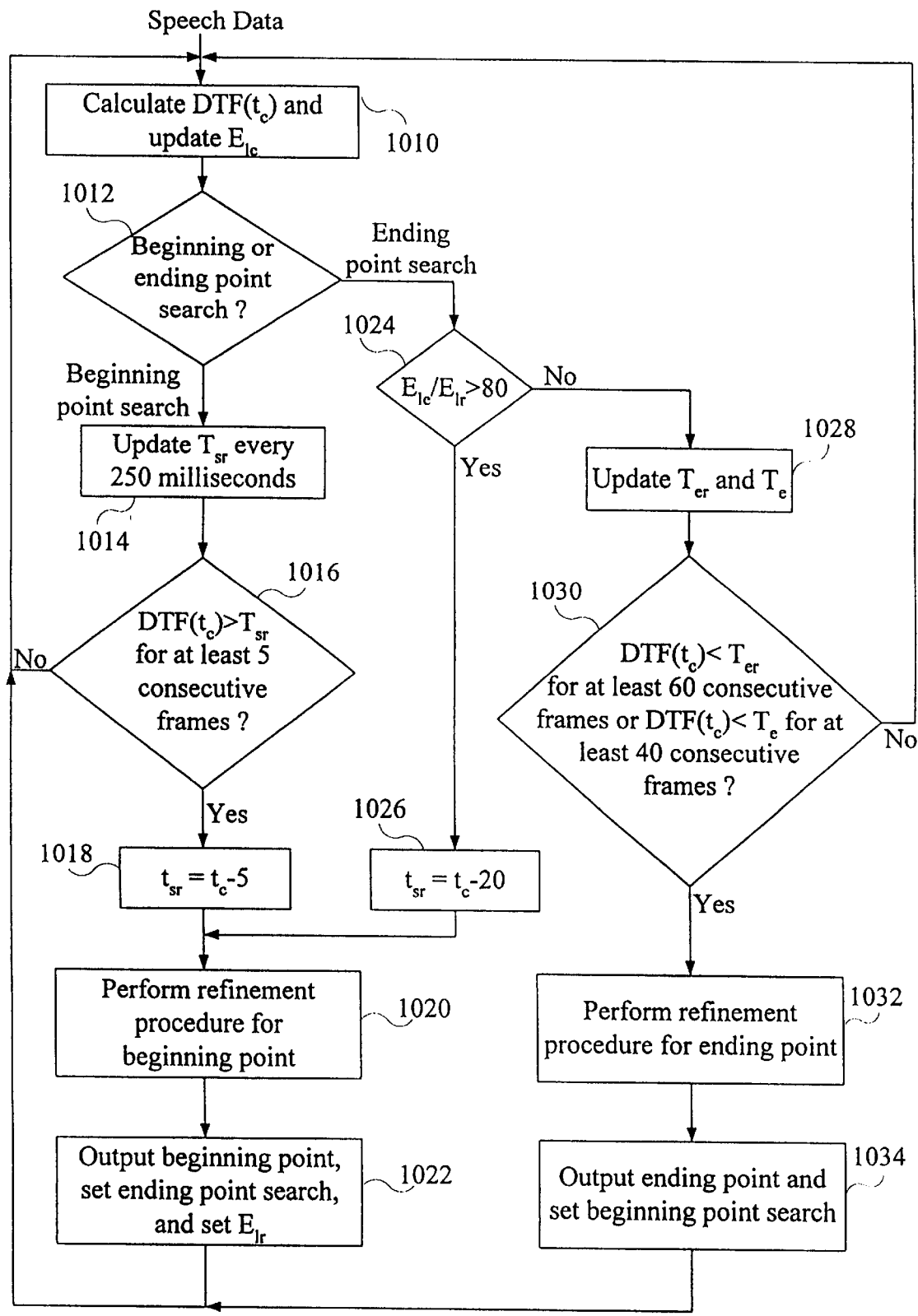
FIG. 10 is a flowchart of preferred method steps for detecting the endpoints of a spoken utterance, according to the present invention.

Referring now to FIG. 10, a flowchart of preferred method steps for detecting the endpoints of a spoken utterance is shown, in accordance with the present invention. The FIG. 10 method performs two fundamental steps of first detecting a reliable island of speech energy and then refining the boundaries (beginning and ending points) of the spoken utterance. The starting point of the reliable island ($t_{sr}$) is detected when the calculated DTF(i) parameter is first greater than threshold $T_{sr}$ 916 for at least five frames. The stopping point of the reliable island ($t_{er}$) is detected when the calculated DTF(i) value is less than threshold $T_{er}$ 922 for at least 60 frames (600 milliseconds) or less than threshold $T_e$ 924 for at least 40 frames (400 milliseconds).

After the starting point $t_{sr}$ of the reliable island is detected, a backward-searching (or refinement) procedure is used to find the beginning point $t_s$ of the spoken utterance. The searching range for this refinement procedure is limited to thirty-five frames (350 milliseconds) from the starting point $t_{sr}$ of the reliable island. The beginning point $t_s$ of the utterance is found when the calculated DTF(i) parameter is less than threshold $T_s$ 912 for at least seven frames. Similarly, the ending point $t_e$ of the spoken utterance may be identified when the current DTF(i) parameter is less than an ending threshold $T_e$ for a predetermined number of frames.

In some cases, speech recognition system 310 may mistake breathing noise for actual speech. In this case, the speech energy during the breathing period typically has a high SNR. To eliminate this type of error, the ratio of the current $E_{le}$ to $E_{ls}$ is monitored by endpoint detector 414. If the starting point $t_{sr}$ of the reliable island is initially obtained from the breathing noise, then $E_{ls}$ is usually a relatively small value and the ratio of $E_{le}$ to $E_{ls}$ will be high when an updated $E_{le}$ is calculated using the actual speech utterance. A predetermined restart threshold level is selected, and if the $E_{le}$ to $E_{ls}$ ratio is greater than the predetermined restart threshold, then endpoint detector 414 determines that the previous starting point $t_{sr}$ of the reliable island is not accurate. Endpoint detector 414 then sends a restart signal to recognizer 418 to initialize the speech recognition process, and then re-examines the beginning segment of the utterance to identify a true reliable island.

In FIG. 10, speech recognition system 310 initially receives speech data from analog-to digital converter 220 via system bus 224 and responsively processes the speech data to provide channel energy to endpoint detector 414, as discussed above in conjunction with FIG. 6. In step 1010, endpoint detector 414 calculates a current DTF($t_c$) parameter (where $t_c$ is the current frame index) as discussed above in conjunction with FIG. 7, and then preferably stores the calculated DTF($t_c$) parameter into DTF registers 312 (FIG. 3). Also in step 1010, endpoint detector 414 calculates a current $E_{le}$ value as discussed above in conjunction with FIG. 9(*b*), and then preferably stores the updated $E_{le}$ value into E value registers 318.

In step 1012, endpoint detector 414 determines whether to conduct a beginning point search or an ending point search. In practice, on the first pass through step 1012, endpoint detector 414 conducts a beginning point search. Following the first pass through step 1012, the FIG. 10 process continues until a beginning point $t_s$ is determined. Then, endpoint detector 414 switches to an ending point search. If endpoint detector 414 is currently performing a beginning point search, then in step 1014, endpoint detector 414 calculates a current threshold $T_{sr}$ 916 as discussed above in conjunction with FIG. 9(*b*), and preferably stores the calculated threshold $T_{sr}$ 916 into threshold registers 314. In subsequent passes through step 1014, endpoint detector 414 updates threshold $T_{sr}$ 916 if 250 milliseconds have elapsed since the previous update of $T_{sr}$ 916.

In step 1016, endpoint detector 414 determines whether the DTF($t_c$) value (calculated in step 1010) has been greater than threshold $T_{sr}$ 916 (calculated in step 1014) for at least five consecutive frames of speech energy 910. If the condition of step 1016 is not met, then the FIG. 10 process loops back to step 1010. If, however, the condition of step 1016 is met, then endpoint detector 414, in step 1018, sets the starting point $t_{sr}$ of the reliable island to a value equal to the current frame index $t_c$ minus 5.

Then endpoint detector 414, in step 1020, performs the beginning-point refinement procedure discussed below in conjunction with FIG. 11 to locate beginning point $t_s$ of the spoken utterance. In step 1022, endpoint detector 414 outputs the beginning point $t_s$ to recognizer 418 and switches to an ending point search for the next pass through step 1012. In step 1022, endpoint detector 414 also sets a value $E_{lr}$ equal to the current value of $E_{ls}$ and preferably stores $E_{lr}$ into E value registers 318.

The FIG. 10 process then returns to step 1010 and recalculates a new DTF($t_c$) parameter based on the current frame index, and also updates the value for $E_{le}$. Since a beginning point $t_s$ has been identified, endpoint detector 414, in step 1012, commences an ending point search. However, in step 1024, if the ratio of $E_{le}$ to $E_{lr}$ is greater than 80, then endpoint detector 414 sends a restart signal to recognizer 418 and, in step 1026, sets starting point $t_{sr}$ to a value equal to the current time index $t_c$ minus 20. The FIG. 10 process then advances to step 1020.

However, in step 1024, if the ratio of $E_{le}$ to $E_{lr}$ is not greater than the predetermined value 80, then endpoint detector 414, in step 1028, calculates a threshold $T_{er}$ 920 and a threshold $T_e$ 924 as discussed above in conjunction with FIG. 9(*b*). Endpoint detector 414 preferably stores the calculated thresholds $T_{er}$ 920 and $T_e$ 924 into threshold registers 314. In step 1030, endpoint detector 414 determines whether the current DTF(t$_c$) parameter has been less than threshold T$_{er}$ 920 for at least sixty consecutive frames, or whether the current DTF(t$_c$) parameter has been less than threshold T$_e$ 924 for at least 40 consecutive frames.

If neither of the conditions in step 1030 is met, then the FIG. 10 process loops back to step 1010. However, if either of the conditions of step 1030 is met, then endpoint detector 414, in step 1032, performs the ending-point refinement procedure discussed below in conjunction with FIG. 12 to locate ending point t$_e$ of the spoken utterance. In step 1034, endpoint detector 414 outputs the ending point t$_e$ to recognizer 418 and switches to a beginning point search for the next pass through step 1012. The FIG. 10 process then returns to step 1010 to advantageously perform endpoint detection on subsequent utterances.

Figure 11:
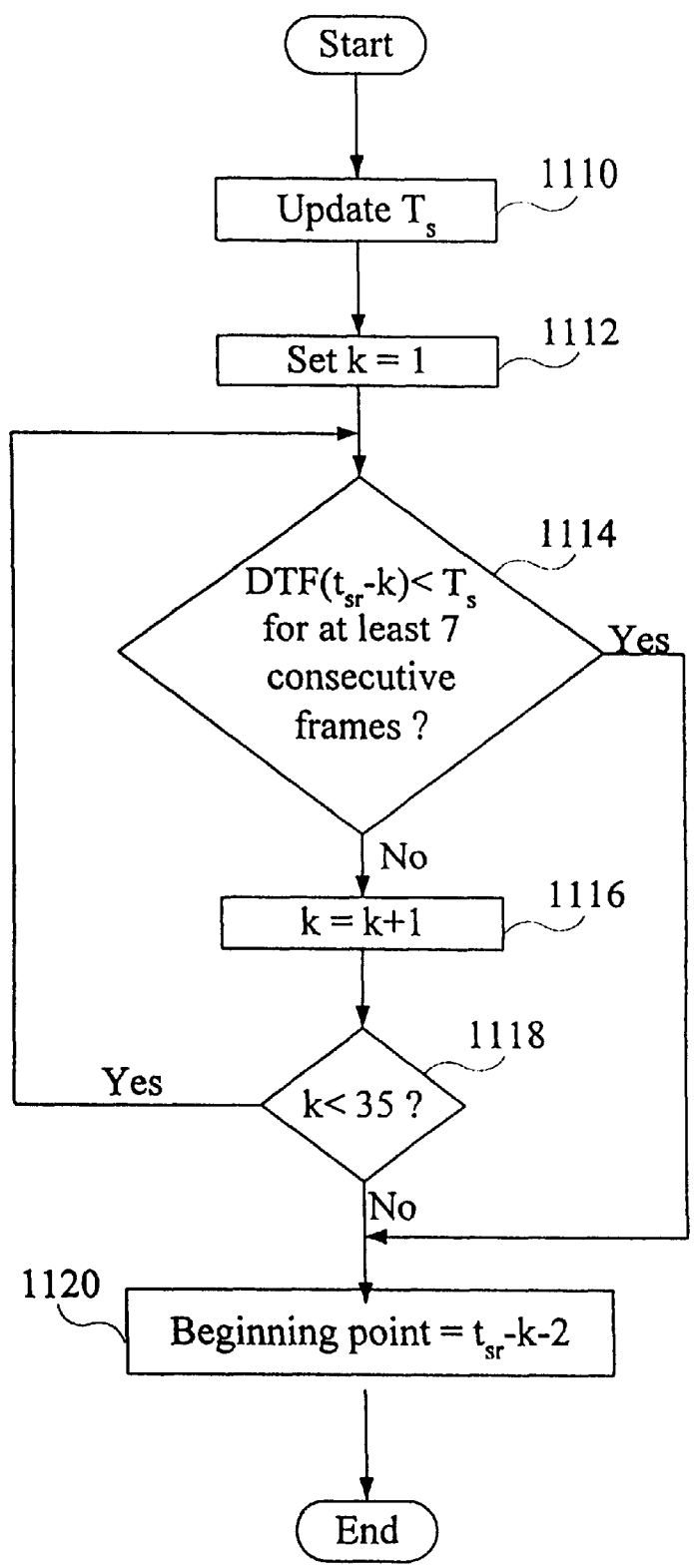
FIG. 11 is a flowchart of preferred method steps for the beginning point refinement procedure of FIG. 10.

Referring now to FIG. 11, a flowchart of preferred method steps for a beginning-point refinement procedure (step 1020 of FIG. 10) is shown. Initially, in step 1110, endpoint detector 414 calculates a current threshold T$_s$ 912 as discussed above in conjunction with FIG. 9(b), and preferably stores the updated threshold T$_s$ 912 into threshold registers 314. Then, in step 1112, endpoint detector 414 sets a value k equal to the value 1.

In step 1114, endpoint detector 414 determines whether the DTF(t$_{sr}$-k) parameter has been less than threshold T$_s$ 912 for at least seven consecutive frames, where t$_{sr}$ is the starting point of the reliable island in speech energy 910 and k is the value set in step 1112. If the condition of step 1114 is satisfied, then the FIG. 11 process advances to step 1120. However, if the condition of step 1114 is not satisfied, then endpoint detector 414, in step 1116, increments the current value of k by the value 1 to equal k+1.

In step 1118, endpoint detector 414 determines whether the current value of k is less than the value 35. If k is less than 35, then the FIG. 11 process loops back to step 1114. However, if k not less than 35, then endpoint detector 414, in step 1120, sets the beginning point t$_s$ of the spoken utterance to the value t$_{sr}$-k-2, where t$_{sr}$ is the starting point of the reliable island in speech energy 910, k is the value set in step 1116, and the constant value 2 is a compensation value for delay from the median filter discussed above in conjunction with FIG. 7.

Figure 12:
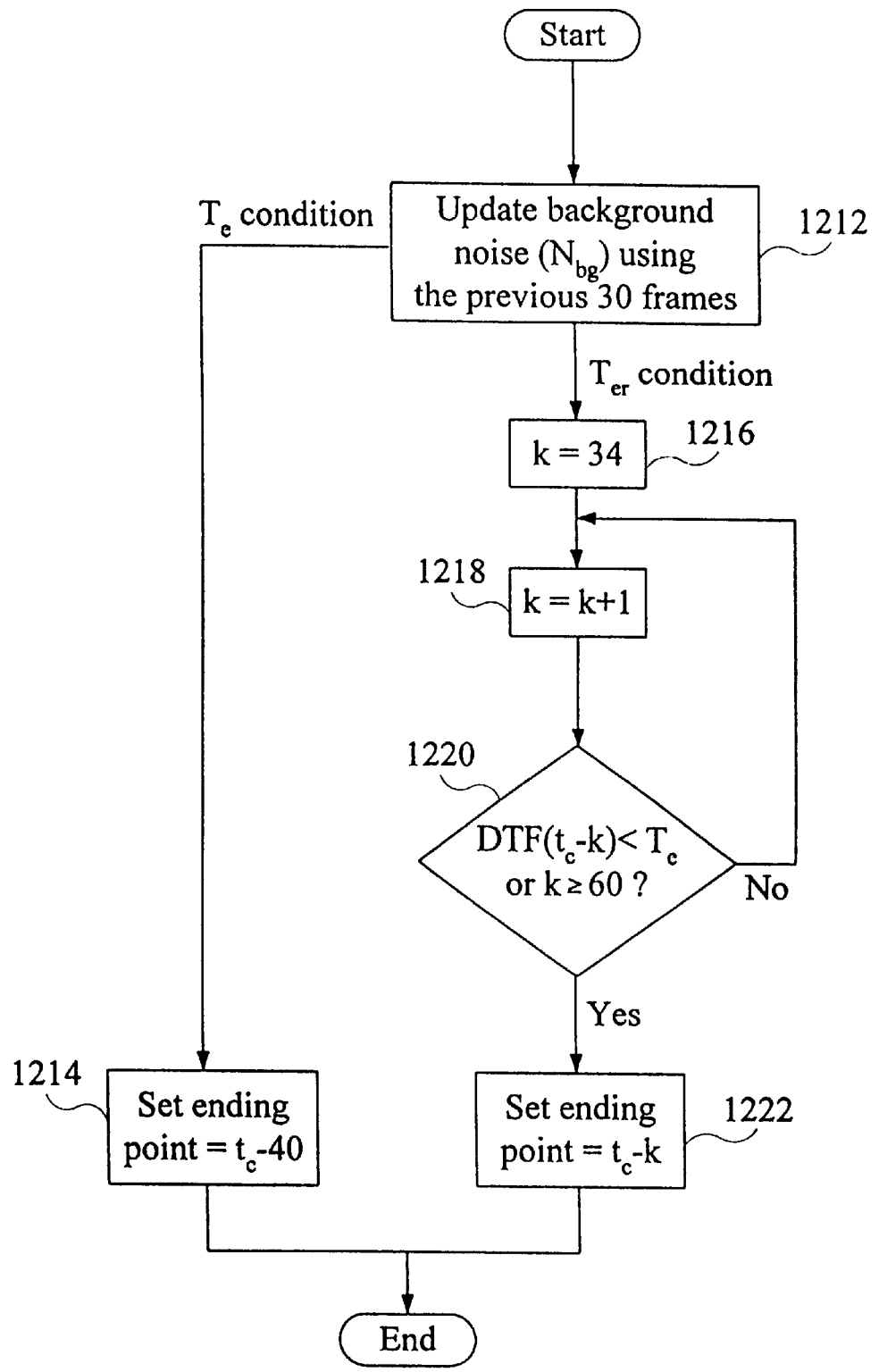
FIG. 12 is a flowchart of preferred method steps for the ending point refinement procedure of FIG. 10.

Referring now to FIG. 12, a flowchart of preferred method steps for an ending-point refinement procedure (step 1032 of FIG. 10) is shown. Initially endpoint detector 414 updates the background noise value N$_{bg}$ using the previous thirty frames of speech energy 910 as a background noise calculation period, and preferably stores the updated value N$_{bg}$ in background noise register 316.

Next, endpoint detector 414 determines which condition was satisfied in step 1030 of FIG. 10. If step 1030 was satisfied by DTF(t$_c$) being less than threshold T$_e$ 924 for at least forty consecutive frames, then endpoint detector 414, in step 1214, sets the ending point t$_e$ of the utterance to a value equal to the current frame index t$_c$ minus 40. However, if step 1030 of FIG. 10 was satisfied by DTF(t$_c$) being less than threshold T$_{er}$ 922 for at least sixty consecutive frames, then endpoint detector 414, in step 1216, sets a value k equal to the value 34. Then, in step 1218, endpoint detector 414 increments the current value of k by the value 1 to equal k+1.

In step 1220, endpoint detector 414 check two separate conditions 1to determine either whether the DTF(t$_c$-k) parameter is less than threshold T$_e$ 924, where t$_c$ is the current frame index and k is the value set in step 1218, or alternately, whether the value k from step 1218 is greater or equal to the value 60. If neither of the conditions in step 1220 are satisfied, then the FIG. 12 process loops back to step 1218. However, if either of the two conditions of step 1220 is satisfied, then endpoint detector 414 sets the ending point t$_e$ of the utterance to a value equal to t$_c$-k, where t$_c$ is the current frame index and k is the value set in step 1218.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for detecting endpoints of an event, comprising:

a processor coupled to said system for receiving energy corresponding to said event; and an endpoint detector, responsive to said processor, for analyzing said energy to calculate threshold values and energy parameters, said endpoint detector comparing said threshold values with said energy parameters to identify a beginning point and an ending point of said event.

2. The system of claim 1 wherein said event is a spoken utterance and wherein said energy is speech energy corresponding to said spoken utterance.

3. The system of claim 2 wherein said endpoint detector analyzes said speech energy in sequential and contiguous frames which are each related to a corresponding sequential frame index.

4. The system of claim 3 wherein said endpoint detector analyzes said speech energy in real time by progressively examining each of said frames of said speech energy in sequence.

5. The system of claim 2 further comprising a filter bank which processes said speech energy and provides band-passed channel energy to said endpoint detector.

6. The system of claim 3 wherein said energy parameters are short-term energy parameters corresponding to said frames of said speech energy.

7. The system of claim 6 wherein said short-term energy parameters are short-term delta energy parameters calculated using the following equation:

$$\text{DTF}'(i) = \Sigma_m |\Sigma_{l=1}^2 l(y_{i+l}(m) - y_{i-l}(m))|/10$$

where DTF'(i) represents said short-term energy parameters and y$_i$(m) is an m-th channel output energy of said filter at a frame index i.

8. The system of claim 6 wherein said endpoint detector smoothes said short-term delta energy parameters by using a multiple-point median filter.

9. The system of claim 6 wherein said speech energy includes at least one reliable island in which said short-term energy parameters are greater than a starting threshold and a stopping threshold.

10. A system for detecting endpoints of an event, comprising:

a processor coupled to said system for receiving energy corresponding to said event, said event being a spoken utterance and said energy being speech energy corresponding to said spoken utterance; and an endpoint detector, responsive to said processor, for analyzing said energy in sequential and contiguous frames which are each related to a corresponding sequential frame index to calculate threshold values and energy parameters which are short-term energy parameters corresponding to said frames of said speech energy, said endpoint detector comparing said threshold values with said energy parameters to identify a beginning point and an ending point of said event, said endpoint detector calculating a background noise value, said background noise value being equal to said short-term energy parameters during to a background noise period, said background noise period ending at least 250 milliseconds ahead of a reliable island and having a normalized deviation that is less than a predetermined value.

11. The system of claim 9 wherein said endpoint detector uses said starting threshold and said short-term energy parameters to determine a starting point for said reliable island.

12. The system of claim 9 wherein said endpoint detector uses said stopping threshold and said short-term energy parameters to determine a stopping point for said reliable island.

13. The system of claim 10 wherein said endpoint detector calculates signal-to-noise ratios corresponding to said speech energy.

14. The system of claim 13 wherein said endpoint detector calculates said threshold values using said signal-to-noise ratios, said background noise value, and pre-determined constant values.

15. The system of claim 6 wherein said endpoint detector calculates a beginning threshold used to refine said beginning point by comparing said short-term parameters to said beginning threshold.

16. The system of claim 6 wherein said endpoint detector calculates an ending threshold used to refine said ending point by comparing said short-term parameters to said ending threshold or said stopping threshold.

17. A system for detecting endpoints of an event, comprising:
a processor coupled to said system for receiving energy corresponding to said event, said event being a spoken utterance and said energy being speech energy corresponding to said spoken utterance,
an endpoint detector, responsive to said processor, for analyzing said energy in sequential and contiguous frames which are each related to a corresponding sequential frame index to calculate threshold values and short-term energy parameters corresponding to said frames of said speech energy, said speech energy including at least one reliable island in which said short-term energy parameters are greater than a starting threshold and a stopping threshold, said endpoint detector comparing said threshold values with said short-term energy parameters to identify a beginning point and an ending point of said event, and
restart generation means to generate a restart signal for recalculating said starting threshold whenever a sequential energy ratio exceeds a predetermined constant value.

18. A system for implementing a speech recognition system, comprising:
a feature extractor for receiving speech data corresponding to a spoken utterance and responsively generating channel energy and feature vectors;
an endpoint detector for analyzing said channel energy to determine endpoints of said spoken utterance; and a recognizer for receiving said endpoints and said feature vectors and responsively generating a speech recognition result.

19. The system of claim 18 wherein said feature extractor further comprises a filter bank for band-passing said speech data to generate said channel energy.

20. A system for implementing a speech recognition system, comprising:
a feature extractor for receiving speech data corresponding to a spoken utterance and responsively generating channel energy and feature vectors, said feature extractor including a filter for band-passing said speech data to generate said channel energy;
an endpoint detector for analyzing said channel energy to determine endpoints of said spoken utterance;
a recognizer for receiving said endpoints and said feature vectors and responsively generating a speech recognition result; and
restart generation means for generating a restart signal to said recognizer whenever a sequential energy ratio exceeds a predetermined constant value.

21. A method for detecting endpoints of an event, comprising the steps of:
analyzing energy from said event to calculate threshold values and energy parameters; and
comparing said threshold values with said energy parameters to identify a beginning point and an ending point of said event.

22. The method of claim 21 wherein said event is a spoken utterance and wherein said energy is speech energy corresponding to said spoken utterance.

23. The method of claim 22 wherein the steps of analyzing and comparing are performed by an endpoint detector that analyzes said speech energy in sequential and contiguous frames which are each related to a corresponding sequential frame index.

24. The method of claim 23 wherein said endpoint detector analyzes said speech energy in real time by progressively examining each of said frames of said speech energy in sequence.

25. The method of claim 22 further comprising a filter bank which processes said speech energy and provides band-passed channel energy to said endpoint detector.

26. The method of claim 23 wherein said energy parameters are short-term energy parameters corresponding to said frames of said speech energy.

27. The method of claim 26 wherein said short-term energy parameters are short-term delta energy parameters calculated using the following equation:

$$\text{DTF}'(i) = \Sigma_m |\Sigma_{l=1}^2 l(y_{i+l}(m) - y_{i-l}(m))|/10$$

where DTF'(i) represents said short-term energy parameters and $y_i(m)$ is an m-th channel output energy of said filter at a frame index i.

28. The method of claim 26 wherein said endpoint detector smoothes said short-term delta energy parameters by using a multiple-point median filter.

29. The method of claim 26 wherein said speech energy includes at least one reliable island in which said short-term energy parameters are greater than a starting threshold and a stopping threshold.

30. A method for detecting endpoints of an event, comprising the steps of:
analyzing energy from said event using an endpoint detector to calculate threshold values and short-term energy parameters, said event being a spoken utterance and said energy being speech energy corresponding to said spoken utterance, said endpoint detector analyzing said speech energy in sequential and contiguous frames which are each related to a corresponding sequential frame index; and comparing said threshold values with said short-term energy parameters using said endpoint detector to identify a beginning point and an ending point of said event, said endpoint detector calculating a background noise value, said background noise value being equal to said short-term energy parameters during to a background noise period, said background noise period ending at least 250 millisecond ahead of a reliable island and having a normalized deviation that is less than a predetermined value.

31. The method of claim 29 wherein said endpoint detector uses said starting threshold and said short-term energy parameters to determine a starting point for said reliable island.

32. The method of claim 29 wherein said endpoint detector uses said stopping threshold and said short-term energy parameters to determine a stopping point for said reliable island.

33. The method of claim 30 wherein said endpoint detector calculates signal-to-noise ratios corresponding to said speech energy.

34. The method of claim 33 wherein said endpoint detector calculates said threshold values using said signal-to-noise ratios, said background noise value, and predetermined constant values.

35. The method of claim 26 wherein said endpoint detector calculates a beginning threshold used to refine said beginning point by comparing said short-term parameters to said beginning threshold.

36. The method of claim 26 wherein said endpoint detector calculates an ending threshold used to refine said ending point by comparing said short-term parameters to said ending threshold or said stopping threshold.

37. A method for detecting endpoints of an event, comprising the steps of:

analyzing energy from said event using an endpoint detector to calculate threshold values and short-term energy parameters, said event being a spoken utterance and said energy being speech energy corresponding to said spoken utterance, said speech energy including at least one reliable island in which said short-term energy parameters are greater than a starting threshold and a stopping threshold, said endpoint detector analyzing said speech energy in sequential and contiguous frames which are each related to a corresponding sequential frame index;

comparing said threshold values with said short-term energy parameters using said endpoint detector to identify a beginning point and an ending point of said event; and using restart generation means for generating a restart signal to recalculate said starting threshold whenever an energy ratio exceeds a predetermined constant value.

38. A method for detecting endpoints of a spoken utterance, comprising the steps of:

analyzing speech energy corresponding to said spoken utterance;

calculating energy parameters in real time, said energy parameters corresponding to frames of said speech energy;

determining a starting threshold corresponding to a reliable island in said speech energy;

locating a starting point of said reliable island by comparing said energy parameters to said starting threshold;

performing a refinement procedure to identify a beginning point for said spoken utterance;

determining a stopping threshold corresponding to said reliable island in said speech energy;

determining an ending threshold corresponding to said spoken utterance;

comparing said energy parameters to said stopping threshold and to said ending threshold; and performing a refinement procedure to identify an ending point for said spoken utterance.

39. The method of claim 38, wherein said step of performing a refinement procedure to identify a beginning point further comprises the steps of:

calculating a beginning threshold corresponding to said spoken utterance;

comparing said energy parameters to said beginning threshold to locate said beginning point of said spoken utterance.

40. The method of claim 38 wherein said step of performing a refinement procedure to identify an ending point further comprises the steps of:

calculating a background noise value; and comparing said energy parameters to said ending threshold to locate said ending point of said spoken utterance.

41. A method for implementing a speech recognition system, comprising the steps of:

receiving speech data corresponding to a spoken utterance and responsively generating channel energy and feature vectors;

analyzing said channel energy to determine endpoints of said spoken utterance; and receiving said endpoints and said feature vectors and responsively generating a speech recognition result.

42. The method of claim 41 further comprising the step of using a filter bank that band-passes said speech data to generate said channel energy.

43. A method for implementing a speech recognition system, comprising the steps of:

receiving speech data corresponding to a spoken utterance and responsively generating channel energy and feature vectors;

analyzing said channel energy to determine endpoints of said spoken utterance;

receiving said endpoints and said feature vectors and responsively generating a speech recognition result;

using a filter that band-passes said speech data to generate said channel energy; and using restart generation means for generating a restart signal whenever a sequential energy ratio exceeds a predetermined constant value.

44. A computer-readable medium comprising program instructions for detecting endpoints of an event by performing the steps of:

analyzing energy from said event to determine threshold values and energy parameters; and comparing said threshold values with said energy parameters to identify a beginning point and an ending point of said event.

45. A computer-readable medium comprising program instructions for implementing a speech recognition system by performing the steps of:

receiving speech data corresponding to a spoken utterance and responsively generating channel energy and feature vectors;

analyzing said channel energy to determine endpoints of said spoken utterance; and receiving said endpoints and said feature vectors and responsively generating a speech recognition result.

46. A system for detecting endpoints of an event, comprising:

means for analyzing energy from said event to determine threshold values and energy parameters; and means for comparing said threshold values with said energy parameters to identify a beginning point and an ending point said event.

47. A system for implementing a speech recognition system, comprising:

means for receiving speech data corresponding to a spoken utterance and responsively generating channel energy and feature vectors;

means for analyzing said channel energy to determine endpoints of said spoken utterance; and means for receiving said endpoints and said feature vectors and responsively generating a speech recognition result.

* * * * *